Feb. 26, 1952  M. W. HUBER  2,587,161
PRESSURE RELIEF VALVE
Filed Sept. 17, 1945

Inventor
Matthew W. Huber

Patented Feb. 26, 1952

2,587,161

UNITED STATES PATENT OFFICE 2,587,161

PRESSURE RELIEF VALVE

Matthew W. Huber, Watertown, N. Y., assignor to The New York Air Brake Company, a corporation of New Jersey Application September 17, 1945, Serial No. 616,858

2 Claims. (Cl. 137—53)

This invention relates to pressure relief valves for use with high-pressure hydraulic systems.

The object of the invention is to produce a relief valve of large capacity which is simple to manufacture and to maintain. A relief valve should be precise in its action, and must be stable, so as to be free of any tendency to vibrate or hum, even when subject to pressure pulsations caused by other apparatus such as high-speed pumps. The pressure at which the valve opens should be adjustable, and there should be a reasonable differential between the pressure at which the valve opens and that at which it closes.

A valve having these characteristics, and embodying the invention, will now be described in detail by reference to the accompanying drawing, in which.

Figures 1, 2:
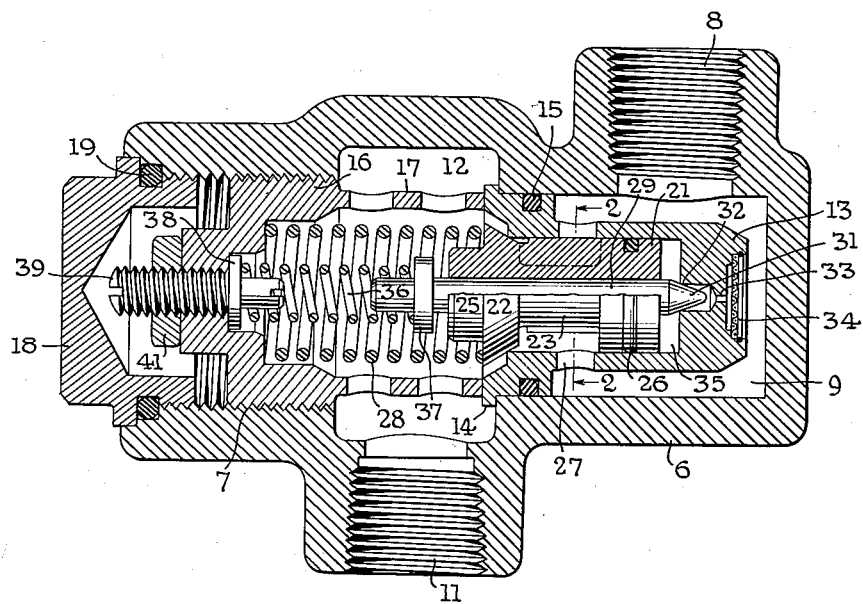
Figure 1 is a longitudinal axial section through the complete valve.
Figure 2 is a fragmentary section on the line 2—2 of Figure 1.

All statements of direction refer to parts as shown in Figure 1, and are relative since the valve will operate in any position.

The body 6 is closed at its right-hand end and is bored from its left end to form chambers hereinafter mentioned. The left-hand portion of the bore is threaded as shown at 7. Formed on the body are the threaded pressure-connection 8 which leads to pressure chamber 9, and the threaded discharge connection 11 which leads from the discharge chamber 12.

A valve seat member 13 separates the chambers 9 and 12. It is positioned by a flange 14 which engages the shoulder formed at the right of chamber 12, and is sealed to body 6 by an elastic ring 15 seated in a peripheral groove in the member 13. Member 13 is held in place by a combined spring-seat and nut 16 which is screwed into threads 7 and has a perforated skirt 17. The latter extends across chamber 12 and engages member 13 to lock the valve-seat member in position. The left end of the bore is closed by a cap nut 18 threaded into threads 7 and sealed by elastic ring 19 mounted in a rebate as shown.

The valve-seat member 13 is counterbored from its left-hand end to receive a balanced main vent valve comprising a cylindrical inner piston-like head 21, an outer conical head 22, dimensioned to seat in the entrance end of the counterbore, a connecting neck 23 with wings 24 and a spring-centering boss 25. Head 21 and wings 24 make a good sliding fit in the counterbore and head 21 is sealed therein by an elastic ring 26 of familiar form. Ports 27 connect pressure chamber 9 and the space within the counterbore between the heads 21 and 22. It follows that the main vent valve is indifferent to pressure in space 9, because heads 21 and 22 are of equal areas so that the valve is balanced, at least when closed.

A coil compression spring 28, which is centered by boss 25, reacts between the valve and nut 16. No means to adjust its stress is needed and none is provided.

The main vent valve is bored axially from end to end to receive freely the cylindrical stem 29 of the pilot valve 31 which is of the needle type. The valve seats at 32 on the rim of a counterbore of limited diameter and controls flow from chamber 9 through a restricting port 33 protected by a fine screen 34. Since the stem 29 makes a free fit in the bore of the main vent valve, the space 35 to the right of head 21 is continuously vented at a restricted rate to discharge connection 11.

Valve 31 is biased in a closing direction by a coil compression spring 36 confined between a collar 37 on stem 29 and a spring seat 38. Spring seat 38 is carried by the end of a screw 39 threaded through member 16, so the stress on spring 36 may be adjusted by turning the screw. A lock nut 41 is used to fix the adjustment so made.

Spring 36 is so adjusted that valve 31 will start to open substantially at the desired maximum pressure in chamber 9. Since the main valve is indifferent to pressure in chamber 9, spring 28 need not be very heavy. A considerable range of choice in selecting the characteristics of this spring is permitted to suit the venting action afforded by flow between stem 29 and the bore in which it is guided. These possibilities may be availed of to modify the operating characteristics, which depend on the following operating principle.

When valve 31 starts to open, liquid will enter chamber 35 and develop therein a pressure whose intensity is limited by outflow along stem 29. At some degree of opening of valve 31 this pressure will be sufficient to unseat head 22 permitting flow from chamber 9 through ports 27 and past head 22 to connection 11. This will tend to reduce pressure in chamber 9, so that valve 31 tends to close. Through these counter effects a state of equilibrium will be reached at which the venting flow rate will serve to limit pressure in chamber 9 to the desired maximum value.

The use of a pilot valve and a main valve, loaded by springs of different characteristics, and hydraulically related, opposes any resonance which otherwise might cause vibration or humming. The restricted port 33 has the effect of damping the action of pressure pulses which may occur in chamber 9 upon the end of the needle valve 31 and need be used only when this condition renders its presence desirable.

The mounting of the pilot valve loosely in the main vent valve is advantageous for two practical reasons. It allows the pilot valve to center itself relatively to its seat. The considerable motion of the main valve relatively to the stem of the pilot valve stem causes the latter to act as a cleaning pin, assuring a clear flow path for the bleeding flow from chamber 35.

The pilot valve may be adjusted readily to fix the pressure at which it responds and this adjustment determines the action of the entire mechanism.

All parts are simple in form and capable of manufacture on a mass production basis.

While a preferred embodiment of the invention has been described in detail, this is illustrative of the principles of the invention, and changes within the scope of the invention are possible and are contemplated.

What is claimed is:

1. A relief valve comprising in combination, means enclosing a pressure chamber; a main valve controlling venting flow from said chamber, said valve including a flow-controlling head and a balancing piston of equal areas subject to pressure in said pressure chamber acting thereon respectively in opposite directions, whereby the valve when closed is rendered indifferent to pressure in said chamber; resilient means biasing said main valve in a closing direction; means forming a motor cylinder in which the balancing piston of said valve may reciprocate and in which fluid pressure when developed urges said main valve in an opening direction, said balancing piston being formed with an axial guideway which leads from said motor cylinder to a point of discharge, and said motor cylinder being provided with an inlet port alined with said guideway; means affording a supply path from the pressure chamber to said inlet port; a needle valve guided in and only partially obstructing said guideway, whereby a constantly open vent from the motor cylinder is afforded, said needle valve controlling said supply port and being urged in its opening direction by fluid-chamber pressure effective in said port; and resilient means biasing said needle valve in its closing direction.

2. The combination defined in claim 1 in which the main valve and the needle valve are arranged to close by motion in the same direction and the resilient biasing means for the two valves comprise coaxial helical springs one reacting against the main valve and the other against the needle valve.

MATTHEW W. HUBER.

REFERENCES CITED

The following references are of record in the file of this patent:

UNITED STATES PATENTS

| Number | Name | Date |
|---|---|---|
| 120,958 | Garland | Nov. 14, 1871 |
| 235,748 | Crisp | Dec. 21, 1880 |
| 2,239,148 | Ernst | Apr. 22, 1941 |
| 2,375,411 | Grant | May 8, 1945 |

FOREIGN PATENTS

| Number | Country | Date |
|---|---|---|
| 1,150 | Great Britain | of 1857 |
| 540,596 | Great Britain | of 1941 |